United States Patent [19]

Izuhara et al.

[11] Patent Number: 4,841,472
[45] Date of Patent: Jun. 20, 1989

[54] WORD PROCESSOR CAPABLE OF AUTOMATIC TILTING OF DOCUMENTS

[75] Inventors: Koichi Izuhara, Osaka, Japan; Jeffrey L. Caruso, Concord, Mass.; Theodore C. Johnson, Seattle, Wash.

[73] Assignee: Minolta Camera Kabushiki Kaisha, Osaka, Japan

[21] Appl. No.: 38,336

[22] Filed: Apr. 14, 1987

Related U.S. Application Data

[63] Continuation-in-part of Ser. No. 729,309, May 1, 1985, abandoned.

[30] Foreign Application Priority Data

Apr. 22, 1986 [JP] Japan .................................. 61-94298
Jul. 31, 1986 [JP] Japan ................................ 61-181432

[51] Int. Cl.$^4$ ............................................ G06F 15/40
[52] U.S. Cl. .................................. 364/900; 364/943; 364/943.1; 364/943.5
[58] Field of Search ... 364/200 MS File, 900 MS File

[56] References Cited

U.S. PATENT DOCUMENTS 4,491,933  1/1985  Ursin et al. .
4,663,736  5/1987  Furusawa et al. .................. 364/900

Primary Examiner—Gareth D. Shaw
Assistant Examiner—Rebecca L. Rudolph
Attorney, Agent, or Firm—Price, Gess & Ubell

[57] ABSTRACT

A word processor including a screen display unit for displaying characters, etc. on a screen, a key input unit for inputting the characters, etc., a print unit for printing document data of documents, a document producing unit for producing the documents from data inputted from the key input unit, and a document control unit for inputting document control data to a recording medium or outputting data stored in the recording medium to the screen display unit. The key input unit includes a command device for giving a command relevant to automatic production of a title of an untitled document, and the document control means includes a title producing device for automatically producing the title of the untitled document in response to the command from the command device.

16 Claims, 16 Drawing Sheets

*Fig. 4*

| | | Pages | Created | Edited |
|---|---|---|---|---|
| 1 Files | | | | |
| 2 □ Blank Paper — 3 | | | | |
| 4 □ Empty Folder — 5 | | | | |
| 10a ▤ The System — 11 | created 1/08/85, 4:21 pm | 88% full | | |
| 10c 12 | | | | |
| 10b | | | | |
| 20a ▤ PCW-1 Data Diskette | created 12/13/84, 7:37 pm | 22% full | | |
| 12 □ Sample Document 1 — 21 | | 5 pp. | 12/14/84 | 1/11/85 |
| 20c □ Sample Document 2 | | 4 pp. | 1/17/85 | 1/17/85 |
| 22 □ TECHNICAL REPORTS FOLDER — 23 | | 3 files | | |
| 4 □ File Specification — 21 | | 3 pp. | 12/14/84 | 1/17/85 |
| □ Manual — 21 | | 2 pp. | 1/14/85 | 1/16/85 |
| 22 □ Summary | | 3 pp. | 12/14/84 | 1/11/85 |
| 30 □ PERSONAL FILES FOLDER — 23 | | 2 files | | |
| 31 □ Personal Document 1 — 21 | | 1 p. | 12/13/84 | 12/20/84 |
| □ Personal Document 2 | | 1 p. | 12/13/84 | 1/19/85 |
| 20b | | | | Insert |

40 — Thursday, January 17, 1985 1:58 pm

Fig. 10

Files
- ▲ Blank Paper
- Empty Folder

| | | Pages | Created | Edited |
|---|---|---|---|---|
| The System | created 1/08/85, 4:21pm | | 88% full | |
| PCW-1 Data Diskette | created 12/13/84, 7:37pm | | 72% full | |
| 130 — ABCDEFGHIJKLMNOPQRSTUVWXYZ1234567 | | 1 p. | 1/17/85 | 1/17/85 |
| 132 — AIR MAIL TO JAPAN | | 1 p. | 1/16/85 | 1/16/85 |
| TECHNICAL REPORTS FOLDER | | 7 files | | |
| SAMPLE FILES FOLDER | | 2 files | | |
| PERSONAL FILES FOLDER | | 6 files | | |

Thursday, January 17, 1985  9:14 am                          Insert

Fig. 13

Files
- ▲ Blank Paper
- ☐ Empty Folder

| | | Pages | Created | Edited |
|---|---|---|---|---|
| ☐ | The System | created 1/08/85, 4:21pm | 88% full | |
| ☐ | PCW-1 Data Diskette | created 12/13/84, 7:37pm | 72% full | |
| ☐ | PLAN OF 1985 Jan. 17, 1985 MINOLT | 1 p. | 1/17/85 | 1/17/85 |
| ☐ | AIR MAIL TO JAPAN | 1 p. | 1/16/85 | 1/16/85 |
| ☐ | TECHNICAL REPORTS FOLDER | 7 files | | |
| ☐ | SAMPLE FILES FOLDER | 2 files | | |
| ☐ | PERSONAL FILES FOLDER | 6 files | | |

134 → (PLAN OF 1985 icon)
140 → (folder icons)

Thursday, January 17, 1985  9:22 am

Insert

Fig. 15

| Files | Pages | Created | Edited |
|---|---|---|---|
| ▲ Blank Paper | | | |
| ☐ Empty Folder | | | |
| ▦ The System | created 1/08/85, 4:21pm | 88%full | |
| ▦ PCW-1 Data Diskette | created 12/13/84, 7:37pm | 72%full | |
| ☐ MINOLTA CAMERA (PLAN OF 1985) | 1 p. | 1/17/85 | 1/17/85 |
| ☐ AIR MAIL TO JAPAN | 1 p. | 1/16/85 | 1/16/85 |
| ☐ TECHNICAL REPORTS FOLDER | 7 files | | |
| ☐ SAMPLE FILES FOLDER | 2 files | | |
| ☐ PERSONAL FILES FOLDER | 6 files | | |

132

140

Thursday, January 17, 1985 5:26 am

Insert

WORD PROCESSOR CAPABLE OF AUTOMATIC TILTING OF DOCUMENTS

CROSS REFERENCE TO THE RELATED APPLICATION

This is a continuation-in-part application of Ser. No. 729,309, filed May 1, 1985, now abandoned.

BACKGROUND OF THE INVENTION

The present invention relates to a word processor for producing and editing documents.

Conventionally, in the case of production of documents by using word processors, it has been so arranged that the documents inputted from a keyboard are temporarily stored in a memory and then, are edited for correction thereof, etc. so as to be printed in a recording medium, for example, a floppy disk. In order to manage a plurality of the documents, a title is put to each document. Furthermore, titles of the documents and access data for files corresponding to the documents in the recording medium are stored in a predetermined area (a directory file) of the recording medium.

An operating system of a host computer for controlling a word processor includes a document management program for performing processing of registration, change, deletion, etc. of the titles of the documents stored in a recording medium. In document management of the known word processors, prior to or after production of a new document and prior to storage of the new document in the recording medium, a title is required to be put to the new document. In the case where a title should be put to a new document prior to production of the new document, the new document cannot be produced unless a title is put to the new document. On the other hand, in the case where a title is put to a new document after production of the new document, the document cannot be stored in the recording medium unless a title is put to the new document. Furthermore, in the latter case, when other operations are performed without putting a title to the new document, the produced new document will be erased.

If the new document can be produced without the need for putting the title to the new document, the new document can be produced easily and such a possibility will diminish that the new document is erased erroneously.

It has been known to provide automatically a document title for a predetermined number of alphanumerical characters if an operator fails to put a title. While this addresses some of the problems of locating a document, it does not provide a solution to all of the potential problems that can occur in entering information from a keyboard into a document.

SUMMARY OF THE INVENTION

Accordingly, an essential object of the present invention is to provide an improved word processor which enables automatic production of a title of a new document at the time of production of the new document regardless of the type of information entered by the keyboard.

In order to accomplish this object of the present invention, a word processor comprises: a screen display means for displaying characters or the like a key input means for inputting the characters or the like, a print means for printing document data of documents: a document producing means for producing documents from data inputted from said key input means, storing the data of said documents in a recording medium and for outputting said document data to said print means: a document management means for inputting, in accordance with an input signal received from said key input means, document management data to a document management data area located at a determined position of said recording medium, for outputting said document management data stored in said recording medium to said screen display means, and for allowing said document producing means to store the data of a document under processing if said document is decided to have a title, said document management data stored in said recording medium including titles of said documents stored in said recording medium and access data for files corresponding to said documents, said key input means including a command means for giving a command in relation to automatic production of a title of said untitled document to said document management means: and said document management means including a title producing means for automatically producing a title of said untitled document when any alphanumerical characters are entered by the user; said title producing means for producing, in response to said command received when an untitled document is under processing, a title of said untitled document from a character string of a predetermined number of characters occupying a portion of said untitled document so as to record the title of said untitled document in said document management data area of said recording medium.

The present inventors have found that operations in word processors are fundamentally composed of repetitions of a step of producing and editing a document, a step of storing the document, a step of displaying a table of the documents stored in a recording medium and a step of designating a document to be edited next. Therefore, if storage of the document (in the case of a new document, accompanied with automatical production of a title of the document) and display of blank paper (start of a new document) or the table of the documents are executed simultaneously, the above described steps can be performed rather smoothly. Furthermore, if automatic production of the title of a new document and storage of the document are performed simultaneously during operations which should be followed by storage of the documents, for example, an operation for completing production and editing of the documents, for displaying the table of the documents and for designating the start of production of another new document, operations of the word processors become easier.

In accordance with the present invention, the title of a new document is automatically produced and the document can be registered and stored by solely operating the command means for giving a command of completion of producing and editing of a document or a command of execution of predetermined operations associated with the completion of production and editing of a document, for example, display of the table of document titles.

An advantage of the present invention is to provide a word processor wherein a new document under editing is automatically stored by the above-described operation, whereby the working efficiency of a word processor is improved.

Another advantage of the present invention is to provide a word processor wherein a title of a new document is automatically produced from a portion of the document even if an operator does not input the title or fails to input the title.

BRIEF DESCRIPTION OF THE DRAWINGS

This object and features of the present invention will become apparent from the following description taken in conjunction with a preferred embodiment thereof with reference to the accompanying drawings, in which:

FIG. 4 is a view indicative of one example of a table of the document titles on the screen;

FIGS. 8 to 11 are views showing one example of automatic production of the document titles displayed on a screen of the word processor of FIG. 1;

FIGS. 12 and 13 are views similar to FIGS. 6 to 8, particularly showing another example of automatic production of the document titles;

FIGS. 14 and 15 are views similar to FIGS. 9 and 10, respectively, particularly showing input of the document titles.

Before the description of the present invention proceeds, it is to be noted that like parts are designated by like reference numerals throughout several views of the accompanying drawings.

DETAILED DESCRIPTION OF THE INVENTION

Hereinbelow, a word processor according to a preferred embodiment of the present invention will be described in the sequence of (a) Configuration of word processor, (b) Configuration of host computer, (c) Document management, (d) Automatic registration of document title and (e) Example of automatic registration of document title.

(a) Configuration of word processor

Figure 1:
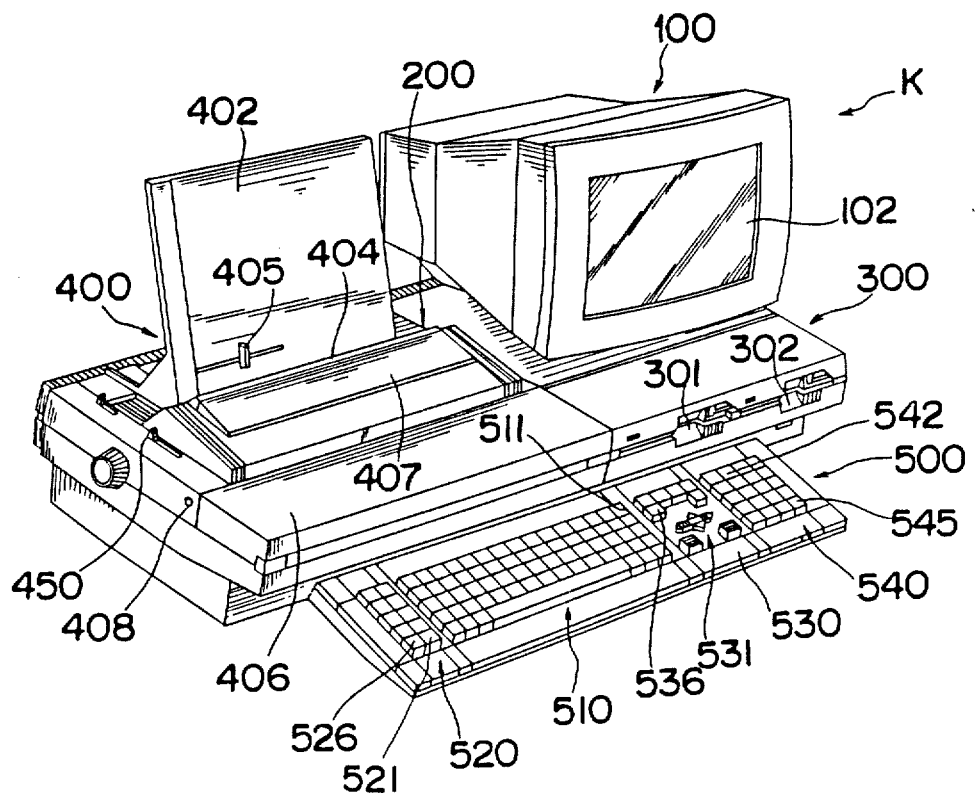
FIG. 1 is a perspective view of a word processor according to the present invention.

FIG. 1 shows an external appearance of a word processor K according to a preferred embodiment of the present invention. The word processor K includes a keyboard 500 acting as an external input device, a host computer 200 (FIG. 2) provided with a power source and electronic parts such as a central processing unit (CPU), a read-only memory (ROM), a random access memory (RAM), etc., a main body 300 provided with floppy disk drives 301 and 302 acting as external memories, a display unit 100 and a daisy wheel type printer 400 acting as external output devices.

More specifically, a main switch (not shown) and the floppy disk drives 301 and 302 acting as the external memories are provided in the main body 300 and are operated directly by an operator. In the display unit 100, there are provided a brightness adjusting knob (not shown) operated directly by the operator and a cathode-ray tube (CRT) screen 102 for displaying an input from the keyboard 500. On an operating face of the keyboard 500, there are provided character keys 510 for inputting alphanumerical characters as in a general typewriter, function keys 520 assigned to special commands in a state of loading of a program of the word processor K, operational keys 530 for performing various operations, and ten keys 540 for inputting numerals, etc.

The keyboard 500 is described in connection with description of the word processor K. The function keys 520 include a New key 521 to be depressed at the start of the production of a new document and a document storage key 526 to be depressed at the time of storage of documents, while the character keys 510 include a Back Space key 511 for returning inputted characters backwardly by one space. Meanwhile, the operational keys 530 include a Cancel key 536 for canceling operations and a Cursor key 531 for displacing a cursor on the CRT screen 102 in the state of loading of the program of the word processor K. Furthermore, the ten keys 540 include a Files key 542 for displaying document titles and folder titles on the CRT screen 102 and an Enter key 545 to be depressed at the time of completion of operations.

Meanwhile, the daisy wheel type printer 400 includes a paper board 402 for sliding print papers thereon, a paper guide 405 for positioning the print papers at the time of insertion of the print papers into the printer 400, a front cover 406, a silent cover 407 for a sound insulation purpose, a visor 404 for preventing reflection of light, a bail lever 450 acting not only as a switch for effecting semi-automatic insertion of the print papers into the printer 400, but also as a paper holder for holding the print papers during printing thereof, etc.

Then, actual procedures for producing the documents in the word processor K will be described, hereinbelow.

Initially, in a state of turning off of the power source, a system disk containing the program of the word processor K and a data disk for storing contents of the produced documents are inserted into the floppy disk drives 301 and 302, respectively. Then, the main switch of the main body 300 is turned on such that the host computer 200 incorporated in the main body 300 is caused to read the contents of the system disk inserted into the floppy disk drive 301. When the contents of the program of the word processor K have been loaded into the host computer 200, a printable space is displayed by a frame 104 on the CRT screen 102 of the display unit 100, and a cursor 103 (FIG. 6) is displayed at a left end of a print start top line of the frame 104 as will be described later. When the character keys 510 of the keyboard 500 are depressed in this state, the inputted characters are each displayed at the position indicated by the cursor 103 on the CRT screen 102.

(b) Configuration of host computer

Figure 2:
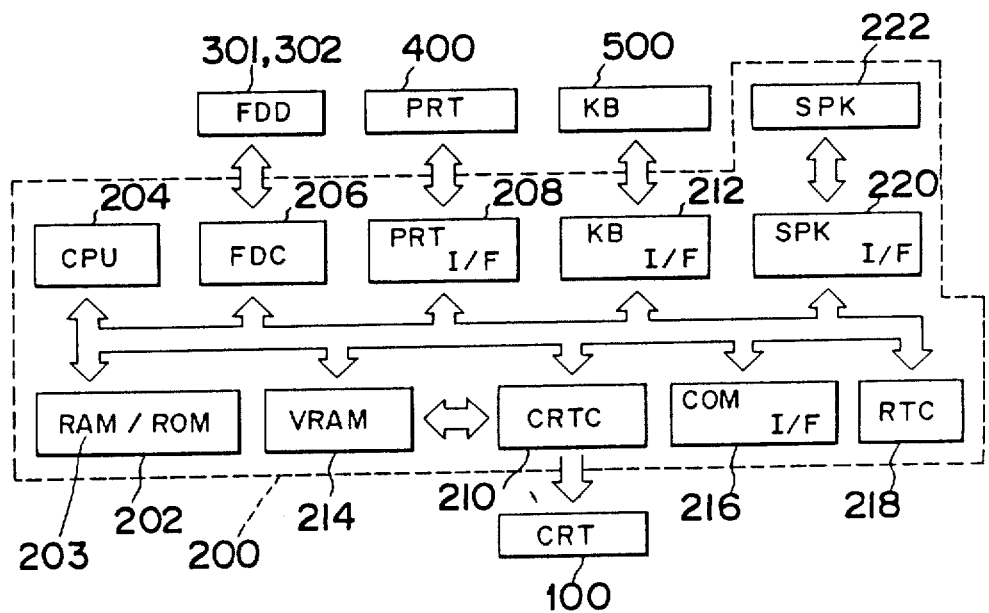
FIG. 2 is a block diagram showing an internal configuration of the word processor of FIG. 1.

Hereinbelow, configuration of the host computer 200 including a ROM/RAM memory 202 and a CPU 204 and input-output processing of signals between data in the ROM/RAM memory 202 and the CPU 204 will be described with reference to FIG. 2. The CPU 204 is a so-called microcomputer for processing. Since registers, input/output ports, etc. of the CPU 204 and their functions are well known, description thereof is abbreviated for the sake of brevity. The host computer 200 further includes a floppy disk controller (FDC) 206 for controlling inputs and outputs of the floppy disk drives 301 and 302, an input-output interface (hereinbelow referred to as an "PRT I/F") 208 to the printer 400, and a CRT controller 210 acting as an output interface to the display unit 100. The CRT controller 210 is connected to a video memory (hereinbelow referred to as a "VRAM") 214.

Furthermore, the host computer 200 includes a keyboard interface (hereinbelow referred to as a "COM I/F?") 216 to external devices, a clock (hereinbelow referred to as an "RTC") 218 for indicating real time and an input/output interface (hereinbelow referred to as an "SPK I/F") 220 to a loudspeaker 222 for generating a warning sound (error sound).

Initially, when the main switch of the main body 300 is turned on in the state where the system disk and the data disk have been inserted into the floppy disk drives 301 and 302, respectively, the CPU 204 stores, through the FDC 206, the contents of the system disk in a RAM 203 of the RAM/ROM memory 202 in accordance with the program of the word processor K. Input signals from the keyboard 500 are applied, through the KB I/F 212, to the CPU 204. Subsequently, the CPU 204 performs processing in accordance with the contents of a storage area of the RAM/ROM memory 202 for storing a screen editing routine so as to apply, via the CRT controller 210, inputs to the display unit 100, and the inputs are displayed on the CRT screen 102. The input signals from the keyboard 500 are sequentially stored in the RAM 203

(c) Document management

A directory for managing the stored documents is stored in each diskette. A title, a level (a hierarchy of a tree structure of each document), the number of the contents (the number of pages), a date of production and a date of updating of each document, and access data for the directory file for storing the documents, etc. are recorded in the directory file.

Figure 3:
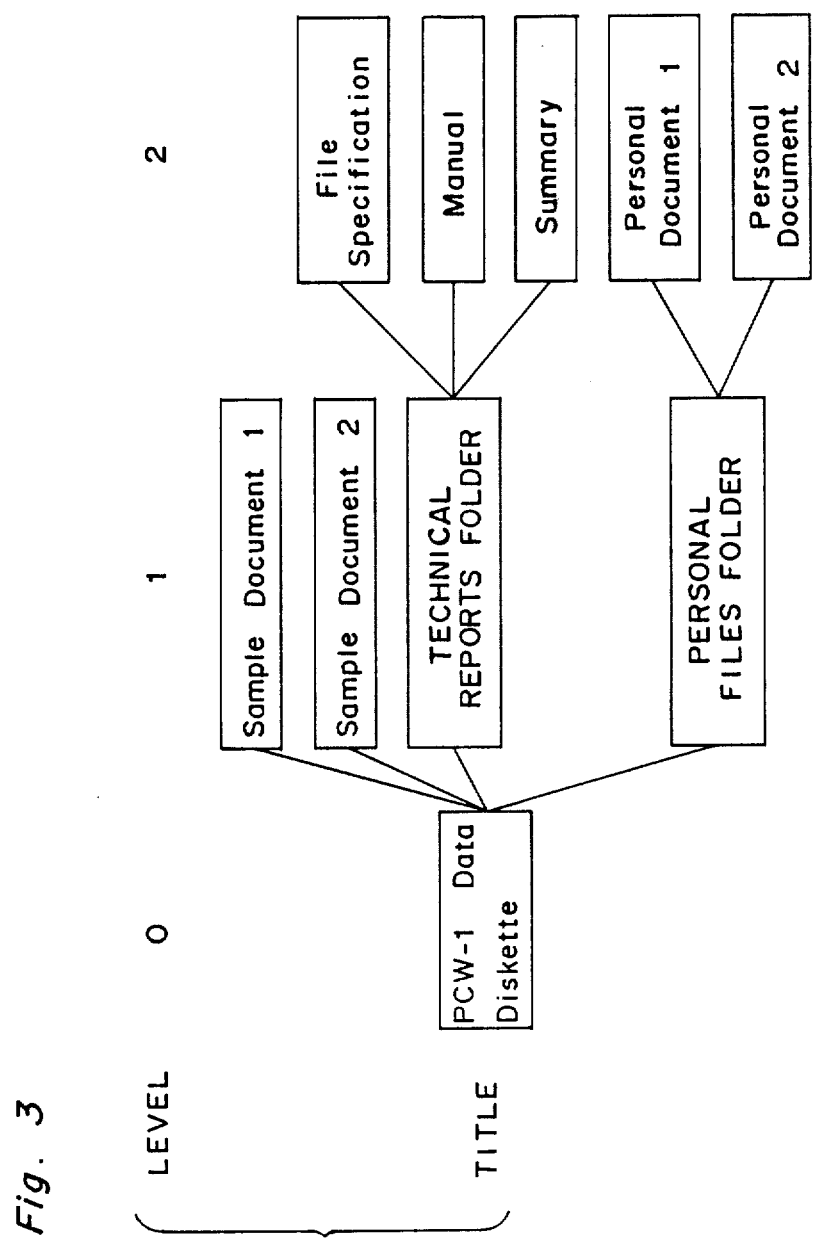
FIG. 3 is a view indicative of one example of a tree structure of the document titles.

Display of document names on the CRT screen 102 will now be described by way of an example wherein a tree structure is composed of such document names as shown in FIG. 3.

In this example, a diskette having a diskette name, PCW-1 Data Diskette, has seven documents stored therein (which documents bear respective document names, Sample Document 1, Sample Document 2, File Specification, Manual, Summary, Personal Document 1, and Personal Document 2). Means for dividing a group of documents into a unit to be bundled is herein referred to as a folder. In this example, the three documents, File Specification, Manual and Summary, belong to a folder named TECHNICAL REPORTS FOLDER. In the tree structure, the independent documents, Sample Document 1 and Sample Document 2, lay in the same level as the two folders, TECHNICAL REPORTS FOLDER and PERSONAL FILES FOLDER.

A directory of diskettes stores data of the documents stored, so that they can be displayed in the form of a table. The data are stored in a unit (shown by one horizontal line) composed of columns for type, level, file name, title, number of contents, data of composition, date of renewal and others.

The type columns of C, D and F mean that a single line recording is carried out for a diskette, a document and a folder, respectively. The level column represents the level in the tree structure. The file name column represents the name (file name) for each document in the diskette. The title column gives the name of a diskette, the name of a document or the name of a folder. The content number column is shown with the storage capacity(%) of the diskette being used, while in the case of a document and a folder, the number of pages and the number of documents stored are shown respectively.

TABLE 1

| Type | Level | File Name | Title | Content Nos. | Date of Composition | Date of Renewal |
|------|-------|-----------|-------|--------------|---------------------|-----------------|
| C | 0 | | PCW-1 Data Diskette | 22 | 12/13/84 | 7:37 pm |
| D | 1 | 1 U 041 AN | Sample Document 1 | 5 | 12/14/84 | 1/11/85 |
| D | 1 | 1 U 041 CE | Sample Document 2 | 4 | 1/17/85 | 1/17/85 |
| F | 1 | | TECHNICAL REPORTS FOLDER | 3 | | |
| D | 2 | 1 U 041 EO | File Specification | 3 | 12/14/84 | 1/17/85 |
| D | 2 | 1 U1 J 036 | Manual | 2 | 1/14/85 | 1/16/85 |
| F | 1 | | PERSONAL FILES FOLDER | 2 | | |
| D | 2 | 1 UO J 2FG | Personal Document 1 | 1 | 12/13/84 | 12/20/84 |
| D | 2 | 1 UO J 2FI | Personal Document 2 | 1 | 12/13/84 | 1/19/85 |

The date-of-production column shows the date of production of a directory file in the case of a diskette, and the date of renewal column shows the date of the current renewal date of production in the case of a document.

(d) Display of document table (Files screen)

When the Files key 542 is depressed, a list of document names and folder names (hereinafter referred to as a document list or files screen) can be displayed on the CRT screen 102 as shown in FIG. 4.

At the first line on the screen (the line number being shown at the rightmost part of FIG. 4 for better understanding), the name of the column (Files, Pages, Created and Edited) is displayed above an underline 1. In the column of Files, the contents of the type column, the level column and the title column of the directory are displayed. In the Pages column, the Created column and the Edited column, the contents of the content number column, the date-of-production column and the date-of-renewal column are displayed, respectively.

At the second line, both a ⌁ symbol 2 and a name "Blank Paper" 3 are displayed. The ⌁ symbol 2 indicates that the name following the symbol is the name of a document. As will be described later, this document is used when a document having no content is to be produced.

At the third line, both a ◻ symbol 4 and a name "Empty Folder" 5 are displayed. The ◻ symbol 4 indicates that the name following the symbol is the name of a folder. As will be described later, this folder is used when a folder having no content is to be produced.

At the fifth line separated from a line 10a at the fourth line, the name 11 of the system disk of the word processor system inserted in the left-hand disk drive unit 301, the hour of use and percentage of the memory used are displayed. A ▣ 12 indicates that the name following this symbol is the name of the diskette. The display is separated by the line 10b (the seventh line) below a blank line. Lines 10a and 10b at the fourth and seventh lines are connected together by a vertical line 10c at the left side.

After another line 20a at the seventh line, lines from the eight onward are used to display the contents corresponding to a respective line of the contents of the directory shown in Table 1. At the eighth line, and following the ⌷ symbol 12 at the right-hand position indicates the diskette (type C) inserted in the right-hand disk drive unit 302, the diskette name, the date of production, the hour of production and the percentage of the memory used are successively displayed. At the tenth and eleventh lines following a blank line, the document names 21, the number of pages, the dates of production and the dates of renewal of the respective documents, Sample Document 1 and Sample Document 2, are displayed, respectively. A line 22 extending in the leftmost and central portions of the twelfth line and in the rightmost portion of the thirteenth line and further extending downwards from the leftmost portion of the twelfth line so as to depict a contour similar to the shape of an upper edge of an actually existing paper folder indicates that the information displayed below such a line 22 is the contents of the folder. The thirteenth line displays both the folder name 23 (TECHNICAL REPORTS FOLDER) and the number of documents contained in this folder. From the fourteenth line to the sixteenth line, the document names 21 (shown as rightwardly indented sequentially since the level is displaced one line below), the number of pages, the dates of production, and the dates of renewal of the respective documents belonging to this folder are displayed.

Similarly, the presence between the sixteenth and eighteenth lines of a line 22 shaped so as to represent the contour of the upper edge of another actually existing paper folder indicates that the information therebelow represents the contents of the folder (the vertical components of the two lines 22 being connected together at the right-hand side). At the eighteenth line, both folder name PERSONAL FILES FOLDER and number of documents contained in this folder are displayed. At the nineteenth and twentieth lines, the dates of production and the dates of renewal of the respective documents belonging to this folder are displayed.

At the twenty-first line, a line 20b is displayed. This line 21b is connected at a left-hand portion with the second line at the seventh line through a vertical line 20c in order to indicate that the display associated with all of the documents has been made.

A cursor position indicator 30 represented by a marking ► shown at the leftmost margin indicates a line at which the cursor 31 is located. The last line (a prompt line) 40 of the screen provides a display of advice for the operator.

As hereinabove described, the Files screen is associated with the type of the directory, the level, the title, the number of contents, the date of production and the date of renewal, and the contents of the directory file can be renewed by editing on the screen in a manner which will now be described. It is to be noted, however, that, where all cannot be displayed on the same screen because of too many documents, they can be displayed when they are scrolled up and down by operating the cursor keys 531.

(e) Automatic registration of document title

When the documents are input to the word processor K with the keyboard 500, the CPU 204 performs various processings in accordance with the contents of the storage area of the RAM/ROM memory 202 for storing the screen editing routine. In connection with automatic registration of the document title, the processing of inputting the documents to the word proessor K will be described with reference to a flowchart of FIG. 5 hereinbelow.

Upon entry, a decision is made at step P1 as to whether any text of any information from the keyboard 500 exists including symbols other than alphanumerical symbols. If no text exists in the memory, then the screen displays a blank paper at step P2. If any text exists, then a decision is made at step P3 as to whether the document identifying the text has already been titled. If it has been titled, then the document title is displayed on the screen 102 at step P4. If no title exists, then the document is automatically defined as untitled and displayed as such at step P5.

When a key on the keyboard 500 is operated at step P6, a decision is made at step P10 as to whether or not the New key 521 has been depressed. In the case of "YES" at step P10, a decision is made at step P11 as to whether or not the document is a new document. In the case of "YES" at step P11, a title is automatically produced from the document at step P12, and the title of the new document is registered in the directory at step P13. Then, the program flow proceeds to step P14. Since the title is produced from an initial sentence of the document at this time, the title clearly reminds an operator of contents of the document even after a long time. Meanwhile, even if the operator fails to put the title of the document, the document is not erased. In the case of "NO" at step P11, the title has been registered and thus, step P14 follows in which the document is stored. Subsequently, a blank paper showing the start of production of a new document is displayed on the CRT screen 102 at step P15.

In the case of "NO" at step P10, a decision is made at step P20 as to whether or not the Files key 542 has been depressed. In the case of "YES" at step P20, a decision is made at step P21 as to whether or not the document is a new document. In the case of "YES" at step P21, a title is automatically produced from the document at step P22, and the title of the new document is registered in the directory at step P23. Then, the program flow proceeds to step P24. In the case of "NO" at step P21, the title has been registered and thus, step P25 follows in which the document is stored. Subsequently, a table (Files screen) showing the documents stored in a recording medium (diskette) in use is displayed on the CRT screen 102, and sorting of the documents, etc. are performed if necessary.

In case of "NO" at step P20, a decision is made at step P30 as to whether or not the document storage key 526 has been depressed. In the case of "NO" at step P30, since characters, etc. of a document have been inputted to the keyboard 500, the document input is edited at step P31. In the case of "YES" at step P30, a document title is produced if necessary and then, is registered in the directory such that the document is stored in the floppy disk in the following procedure. At first, the document title is inputted to the keyboard 500 at step P32. Then, a decision is made at step P33 as to whether or not the document is a new document, namely, whether or not the title has been registered in the directory. In the case of "YES" at step P33, the title of the new document is produced so as to be registered in the directory at step P34. Thereafter, the document is stored in the floppy disk at step P35 and then, the program flow returns to step P1 in a waiting state for the next key input. In the case of "NO" at step P33, the title of the document is changed at step P36 and then, the document is stored in the floppy disk at step P35. Meanwhile, when the Cancel key 536 has been depressed during input of the document title at step P32, input of the document title is cancelled and then, the program flow returns to step P1 in the waiting state for the next key input.

Thereafter, in the case of "NO" at step P32, a decision is made at step P37 as to whether or not the document is a new document. In the case of "YES" at step P37, a title is automatically produced from the document at step P38 as will be described later in detail and then, step P34 follows. In the case of "NO" at step P37, since the document title has been already registered, the program flow proceeds to step P35.

If no alphanumerical characters have been entered in the document, then the subroutine of automatically producing a title from a predetermined number of alphanumerical characters cannot be executed at step P38. However, the document has already been titled as "Untitled" at step P5 and continues to carry this title message as indicative of a document with alphanumerical characters unavailable.

Figure 6:
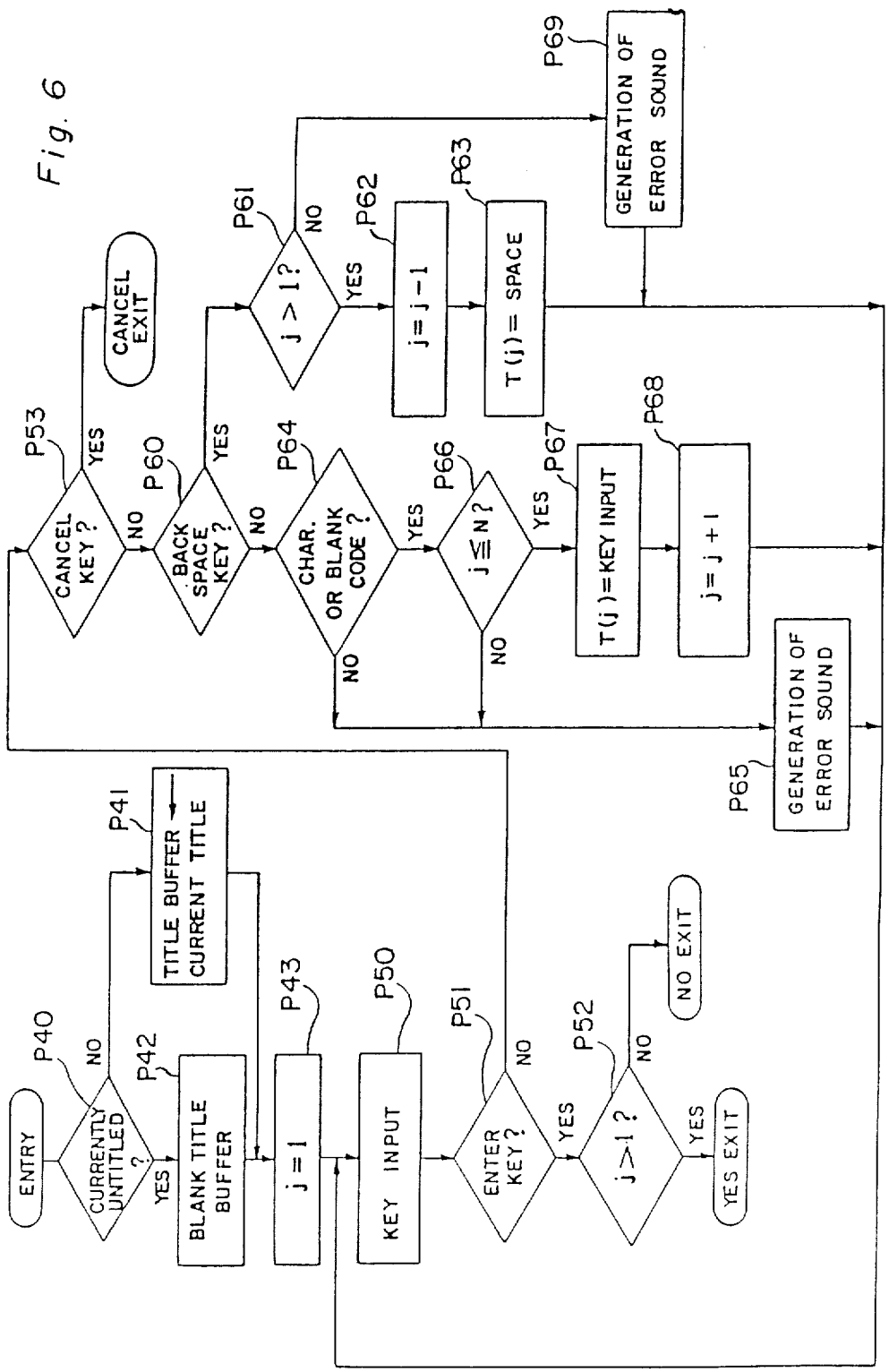
FIG. 6 is a flowchart showing input of the document titles in the word processor of FIG. 1.

Hereinbelow, input of the document title (step P32) will be described in detail with reference to a flowchart of FIG. 6. In FIG. 6, characters j and T(j) represent an index of a title buffer T and a j-th character of the title buffer T, respectively. Initially, a decision is made at step P40 as to whether or not the document under processing lacks a formal title. In the case of "NO" at step P40, the old title of the document is inputted to the title buffer T and is displayed on the CRT screen 102 at step P41. In the case of "YES" at step P40, the title buffer T is blanked at step P42. Then, an index j is set to 1, namely, the index j is initialized at step P43 and then, step P50 follows for applying a key input to the board 500.

When the key input is applied to the keyboard 500 at step P50, a decision is made at step P51 as to whether or not the Enter key 545 has been depressed. In the case of "YES" at step P51, a decision is made at step P52 as to whether or not the index j is larger than 1. In the case of "YES" at step P52, since input of the title has been completed, the program flow proceeds to step P33 of FIG. 5. In the case of "NO" at step P52, since input of the title has not been performed, the program flow proceeds to step P37 of FIG. 5.

Meanwhile, in the case of "NO" at step P51, a decision is made at step P53 as to whether or not the Cancel key 536 has been depressed. In the case of "YES" at step P53, input of the document title is cancelled and then the program flow proceeds to step P1 of FIG. 5. Thus, even after the document storage key 526 has been depressed erroneously, it is possible to cancel input of tee document storage key 526.

In the case of "NO" at step P53, the title can be manually inputted to the keyboard 500 in the following procedure. First, a decision is made at step P60 as to whether or not the Back Space key 511 has been depressed. In the case of "YES" at step P60, a decision is made at step P61 as to whether or not the index j is larger than 1. In the case of "NO" at step P61, since input of the title has not yet been performed, an error sound is generated at step P69, and the program flow proceeds to step P50 for demanding a key input to the keyboard 500. Meanwhile, in the case of "YES" at step P61, 1 is subtracted from the index j at step P62 and then, a space is inputted to the character T(j) so as to be displayed on the CRT screen 102 at step P63 followed by step P50.

Meanwhile, in the case of "NO" at step P60, a decision is made at step P64 as to whether or not the key input of a character code or a blank code has been applied to the keyboard 500. In the case of "NO" at step P64, an error sound is generated at step P65 and then, step P50 follows. In the case of "YES" at step P64, a decision is made at step P66 as to whether or not the index j is equal to or less than the maximum value N, an error sound is generated at step P65 followed by step P50. In the case of "YES" at step P66, the key input is applied to the character T(j) at step P67 and then, 1 is added to the index j at step P68. Supposing that the number N represents a maximum value of the number of the characters of the document title, the maximum value N is set to 33 in this embodiment of the present invention.

Figure 7:
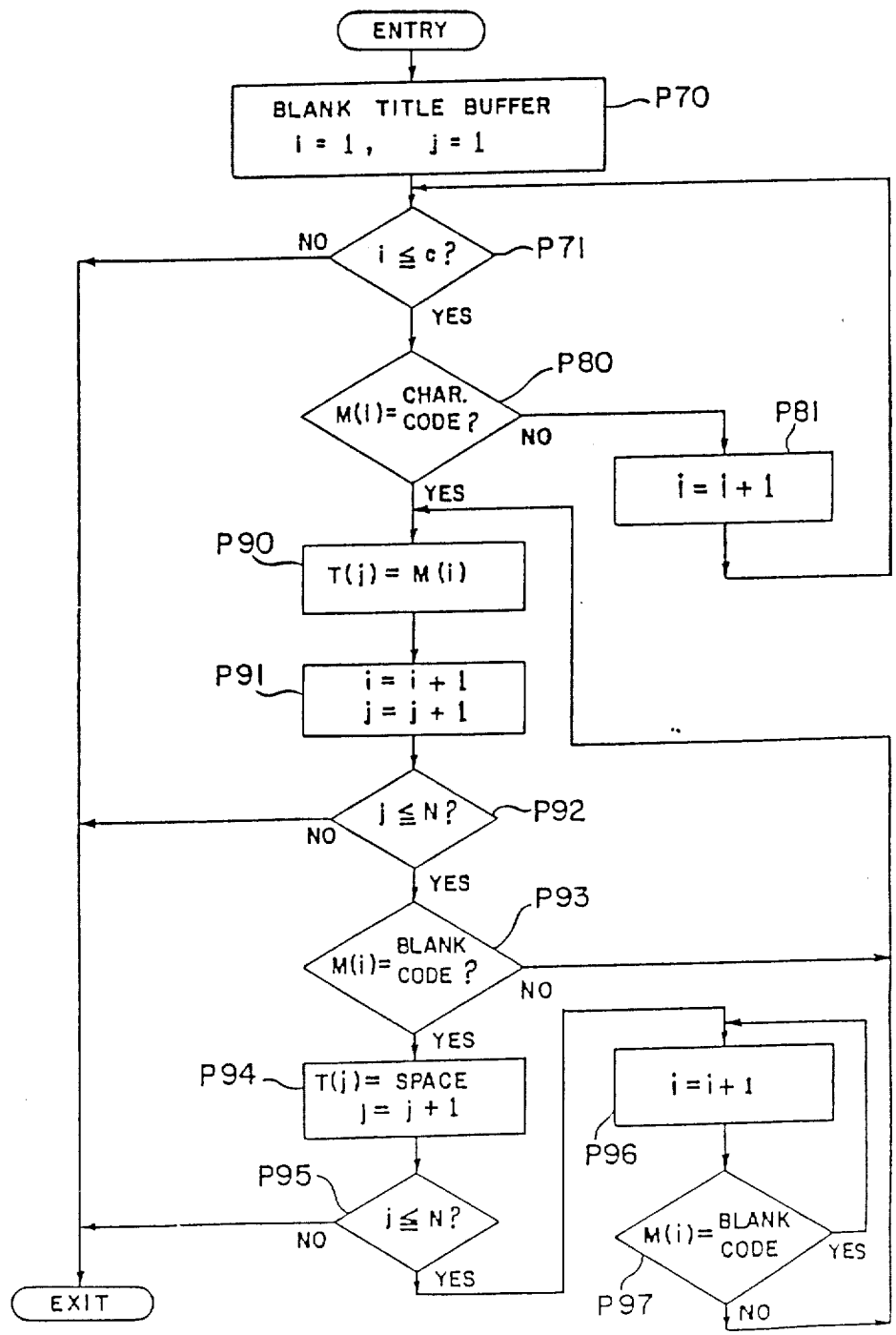
FIG. 7 is a flowchart showing automatic production of document titles in a word processor (FIG. 1) according to the present invention.

Hereinbelow, automatic registration (steps P12, P22, P36 of FIG. 5) of the title from a document will be described in detail with reference to a flowchart of FIG. 7. In FIG. 7, characters i and M(i) represent an index of a document memory M and an i-th character of the document memory M, respectively. Initially, at step P70, the title buffer T is blanked and then, the index i of the document memory M and the index j of the title buffer T are set to 1 for initialization thereof. Thereafter, a decision is made at step P71 as to whether or not the index i is less than or equal to the number C of characters on the current page. In the case of "NO" at step P71, since there are no alphanumerical characters available, no title is produced and the program returns to the main flow.

Thereafter, a decision is made at step P80 as to whether or not the character M(i) is a character code. In the case of "NO" at step P80, 1 is added to the index i at step P81 and then, the program flow returns to step P80 such that a first letter of the document is detected.

Then, 33 characters are inputted to the title buffer T. At first, the character M(i) is inputted to the character T(j) at step P90 and then, 1 is added to the indexes i and j at step P91. Thereafter, a decision is made at step P92 as to whether or not the index j is equal to or less than the maximum value N. In the case of "NO" at step P92, since the title has been produced, the program flow proceeds to step P21 of FIG. 4. Meanwhile, in the case of "YES" at step P92, a decision is made at step P93 as to whether or not the next character M(i) of the document is one of blank codes such as space codes, tabulation codes, line feed codes, etc. In the case of "NO" at step P93, the program flow returns to step P90.

Meanwhile, in the case of "YES" at step P93, a space is inputted to the character T(j) and 1 is added to the index j at step P94. Then, a decision is made at step P95 as to whether or not the index j is equal to or less than the maximum value N. In the case of "NO" at step P95, since the title has been produced, the program returns to the main flow. Meanwhile, in the case of "YES" at step P95, 1 is added to the index i at step P96 and then, a decision is made at step P97 as to whether or not the next character M(i) of the document is one of the blank codes. In the case of "YES" at step P97, the program flow returns to step P96. In the case of "NO" at step P97, the program flow returns to step P90.

By using a loop flowing between steps P92 and P97, the blank codes such as the space codes, the tabulation codes, the line feed codes, etc. are reduced, in length, to one space. Thus, even if the document has many blank codes, its title can be efficiently registered. By employing this automatic registration of the document title, it becomes possible to edit the documents sequentially without the need for storing the documents in the diskette.

(f) Examples of automatic registration of document title

Figure 8:
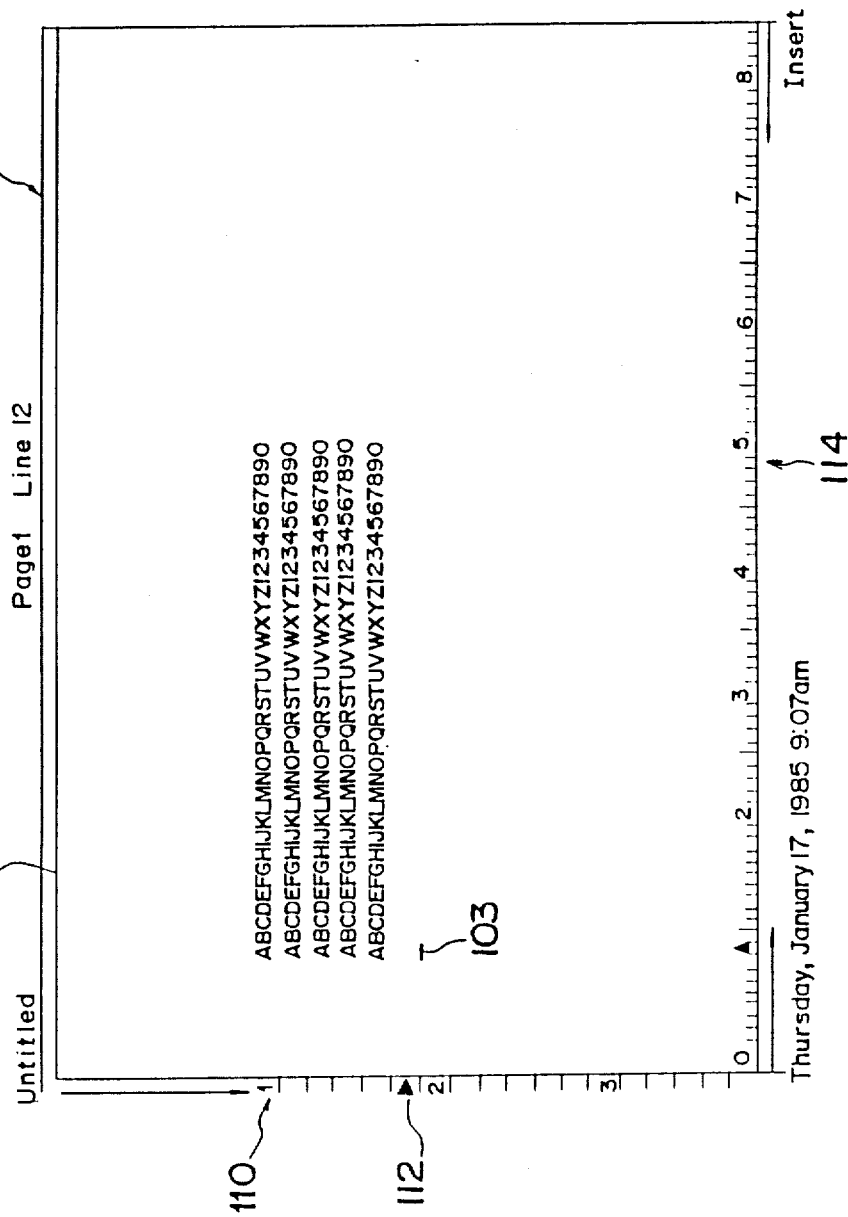

Hereinbelow, examples of automatic registration of the document title will be described. FIG. 8 shows an example of the document which is produced on the CRT screen 102. The document input from the keyboard 500 is displayed in the frame 104. At the left end of the frame 104, a scale 110 for indicating vertical positions of lines is displayed. Numerals of the scale 110 express, in inches, distances from the upper end of the scale 104. A mark 112 points to a line at which the cursor 103 is positioned. In the case where the key input is applied to the keyboard 500 by single line spacing, six lines can be inputted in one inch.

At the upper end of the frame 104, there are displayed characters "Untitled" for indicating that the inputted document is a new document and is untitled and characters "Page 1 Line 12" for indicating the position of the cursor 103. Furthermore, at the lower end of the frame 104, a scale 114 is displayed for indicating positions of lines sidewise. A date is displayed below the scale 114.

In the example shown in FIG. 8, the content "ABC . . . XYZ1234567890" is inputted to each line from the seventh to the eleventh line at step P27 (FIG. 5) and the cursor 103 is positioned at the ninth character of line 12.

Figure 9:
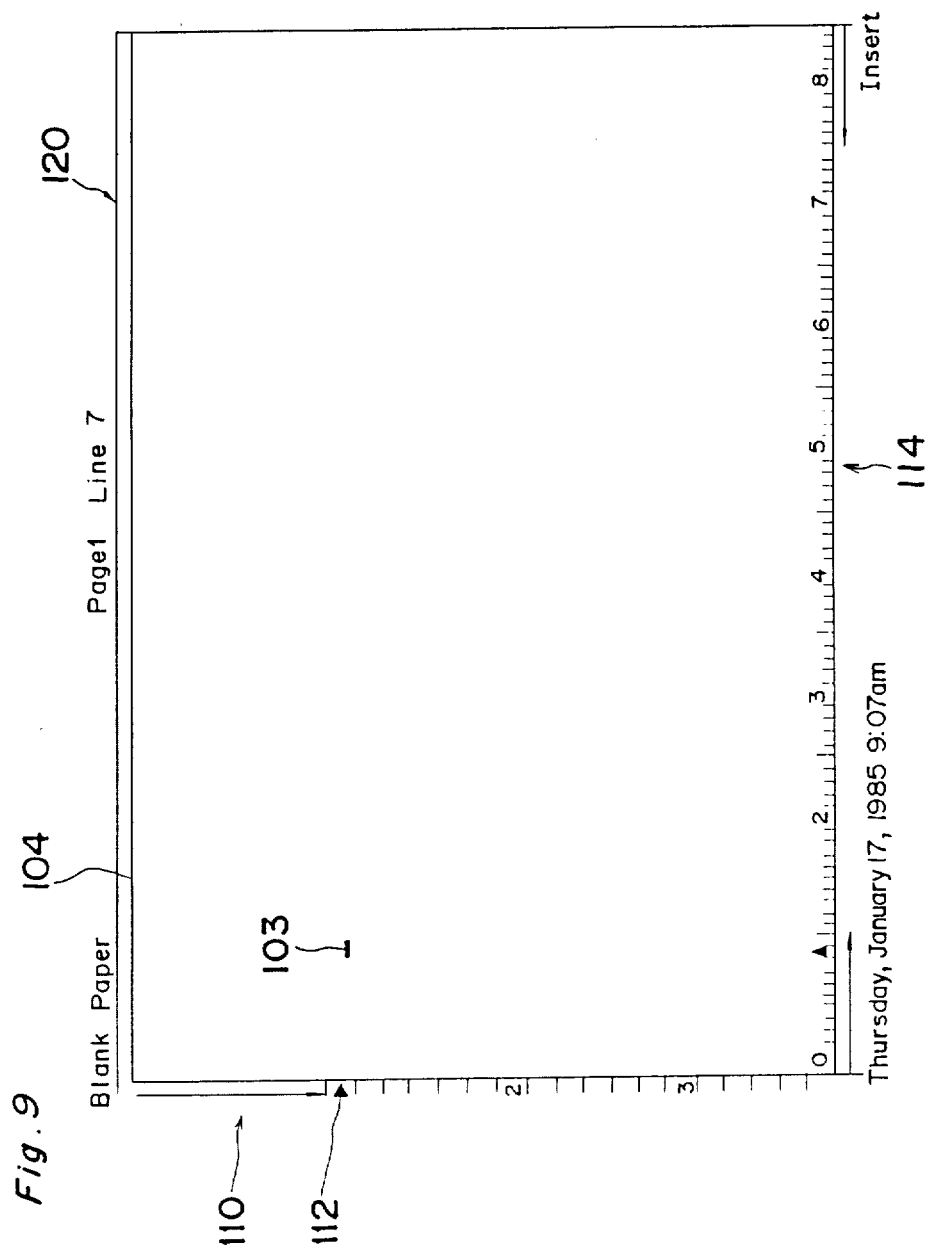

In a first example, the New key 521 is assumed to be depressed ("YES" at step P10 in FIG. 5) after the new document shown in FIG. 8 is typewritten with the keyboard 500. Then, a title of the new document is automatically produced from the document at step P12 since it is found at step P11 that the document is a new document. Namely, thirty-three characters starting from the character A, which is positioned at the ninth character of line 7 as the first character of the document, are inputted to the title buffer T, and the title thus produced automatically from the document is registered in the directory at step P13. Then, the new document is stored in the floppy disk at step P14. Finally, a blank paper is displayed on the CRT screen 102 as shown in FIG. 9, wherein characters "Blank Paper" and characters "Page 1 Line 7" of the position of the cursor 103 are displayed on an upper line.

In a second example, the Files key 542 is assumed to be depressed ("YES" at step P20 in FIG. 5) after the new document shown in FIG. 8 is typewritten with the keyboards 500. First, a decision is made at step P21 as to whether or not the document is a new document. Because the decision is "YES" at step P21, a title is automatically produced from the document at step P22 as explained above in the first example. Since the title is produced from an initial sentence of the document at this time, the title clearly reminds an operator of contents of the document even after a long time. Meanwhile, even if the operator fails to input the title of the document, the document is not erased. Subsequently, a table (Files screen) showing the documents stored in a recording medium (diskette) in use is displayed on the CRT screen 102 and sorting of the documents, etc. are performed if necessary at step P25. That is, a table showing titles of the independent documents (indicated by a mark " ⌺ ") and titles (indicated by a mark " ⌺ ") of the folders is displayed on the CRT screen 102 as shown in FIG. 10. At this time, a title 130 of the document which has been newly registered in the directory is displayed above titles 132 of the independent documents and folders which have already been registered in the directory.

Figure 11:
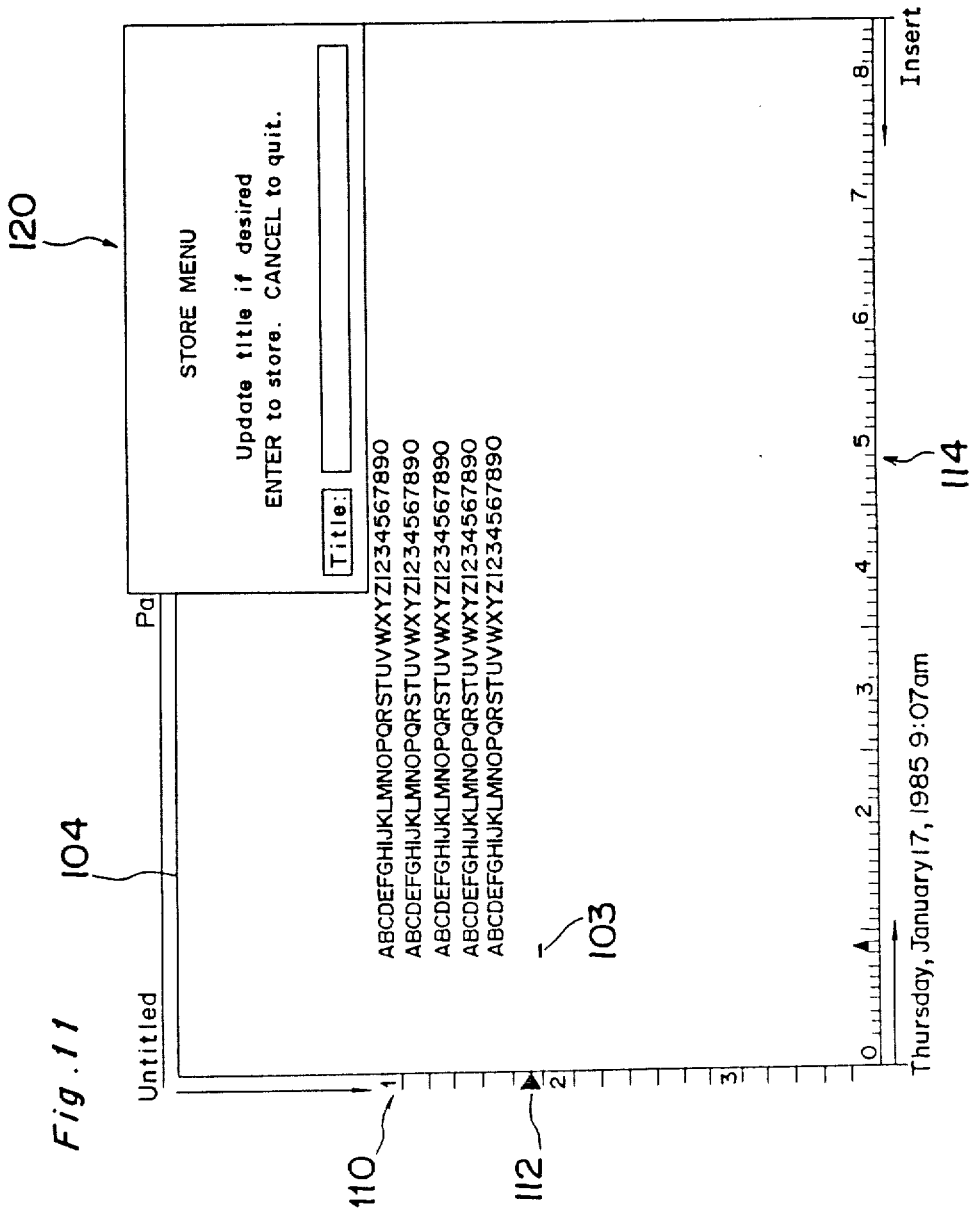

In a third example, the document storage key 526 is assumed to be depressed ("YES" at step P26). Then a document title should be inputted to the keyboard 500 at step P30. At this time, a menu 120 for document storage is displayed on the CRT screen 102 as shown in FIG. 11 so as to indicate the next operation.

When the Enter key 545 is depressed immediately at step P50 (FIG. 6) after the new document shown in FIG. 8 is typewritten with the keyboard 500, the document title is automatically produced from the document at step P36 (FIG. 5) since it is decided at step P30 that the document is a new document. Namely, thirty-three characters starting from the character A as the first character of the document are inputted to the title buffer T, and the title automatically produced from the document is registered in the directory at step P32. Then, the inputted document is stored in the floppy disk at step P33.

Figure 5A:
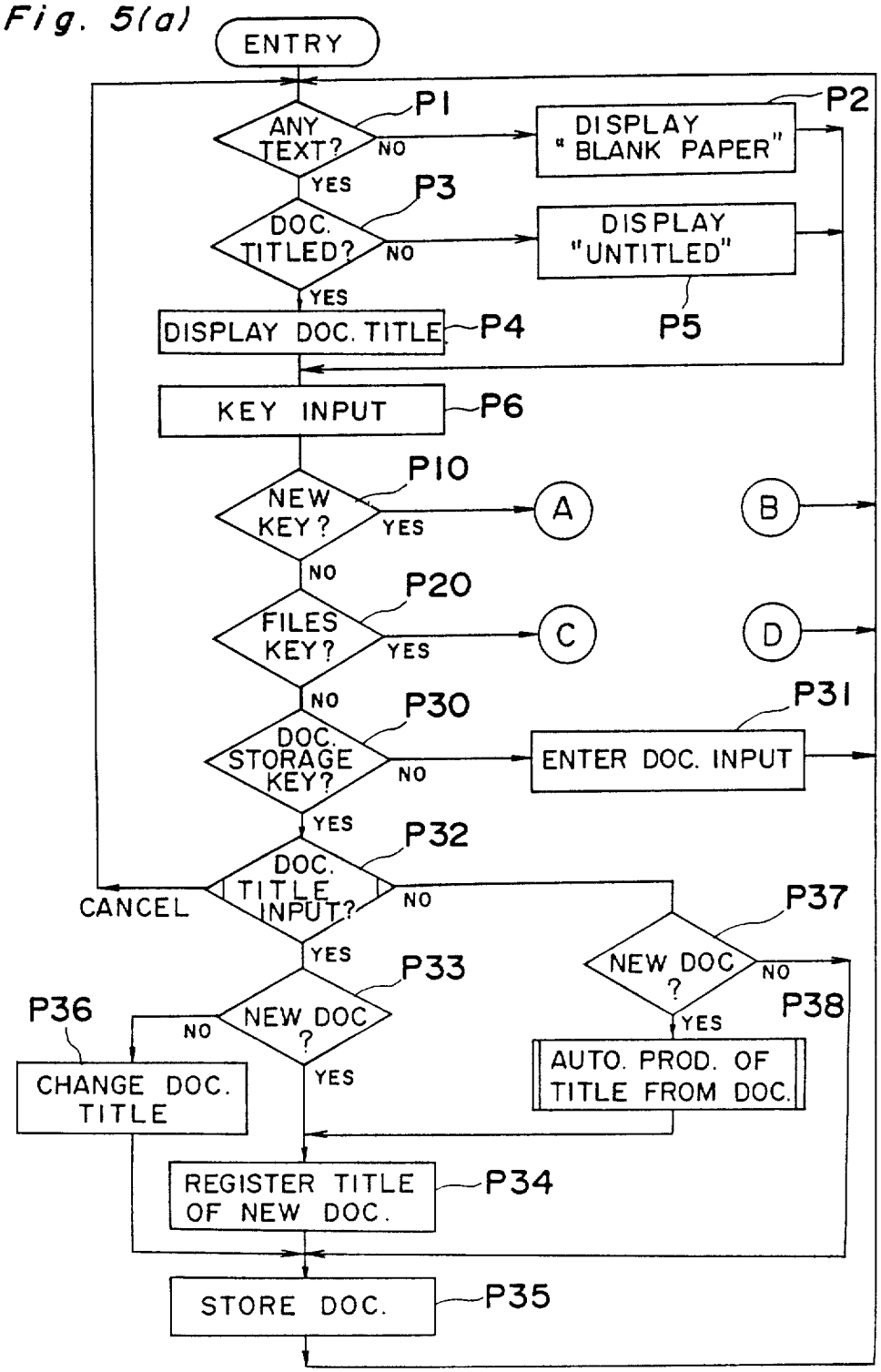
FIGS. 5(a) and 5(b), are flowcharts showing production of documents in the word processor of FIG. 1
Figure 5B:
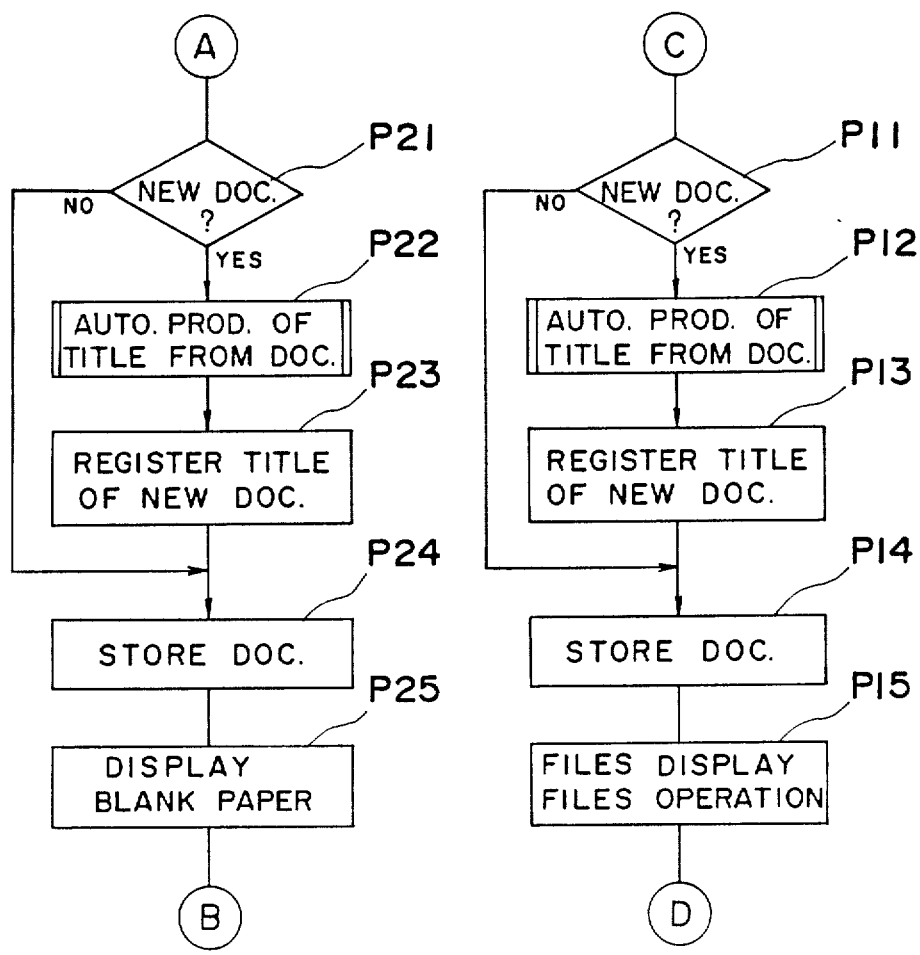

Subsequently, when the Files key 542 is depressed at step P20 , a table showing titles (indicated by a mark " ⌺ ") of the folders is displayed on the CRT screen 102 as shown in FIG. 10 (step P25 in FIG. 5).

Figure 12:
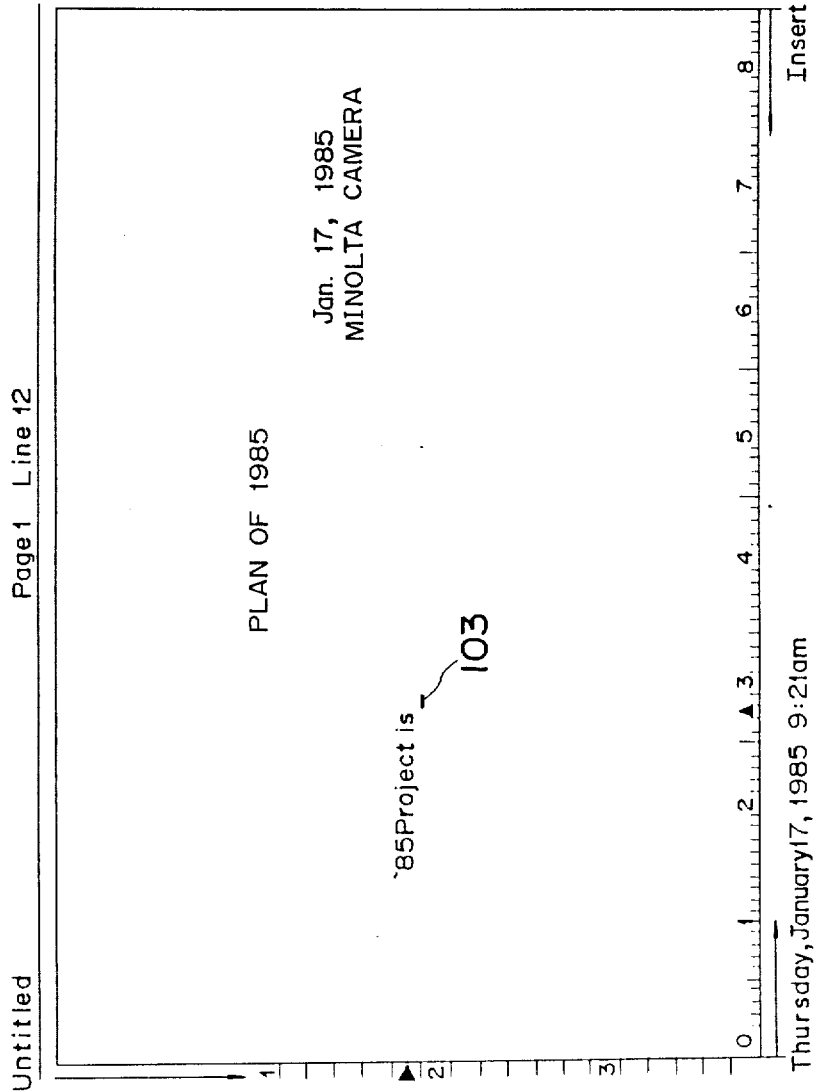

Next, a fourth example of automatic production of the document title will be described. FIG. 12 shows another new document displayed on the CRT screen 102. In FIG. 12, at page 1, character strings "PLAN OF 1985", "Jan. 17, 1985", "MINOLTA CAMERA" and "'85 Project is" are inputted to lines 7, 9, 10 and 12, respectively. The cursor 103 is positioned at line 12.

When the document storage key 526 is depressed and then, the Enter key 545 is depressed immediately, the document title is automatically produced. The result is displayed by an uppermost title 134 of the Files screen of FIG. 13. In this case, the newly produced title includes 33 characters ranging from the first character "P" of line 7 to the character "T" of line 10 in FIG. 12. Space codes occurring up to the first character "P" of line 7 are omitted. It is to be noted that space codes and line feed codes occurring from the numeral "5" of line 7 to the character "J" of line 9 are reduced, in length, to one space. Likewise, space codes and line feed codes occurring from the numeral "5" of line 9 to the character "M" of line 10 are reduced, in length, to one space. Thus, the document tile can be efficiently registered in the directory.

Figure 14:
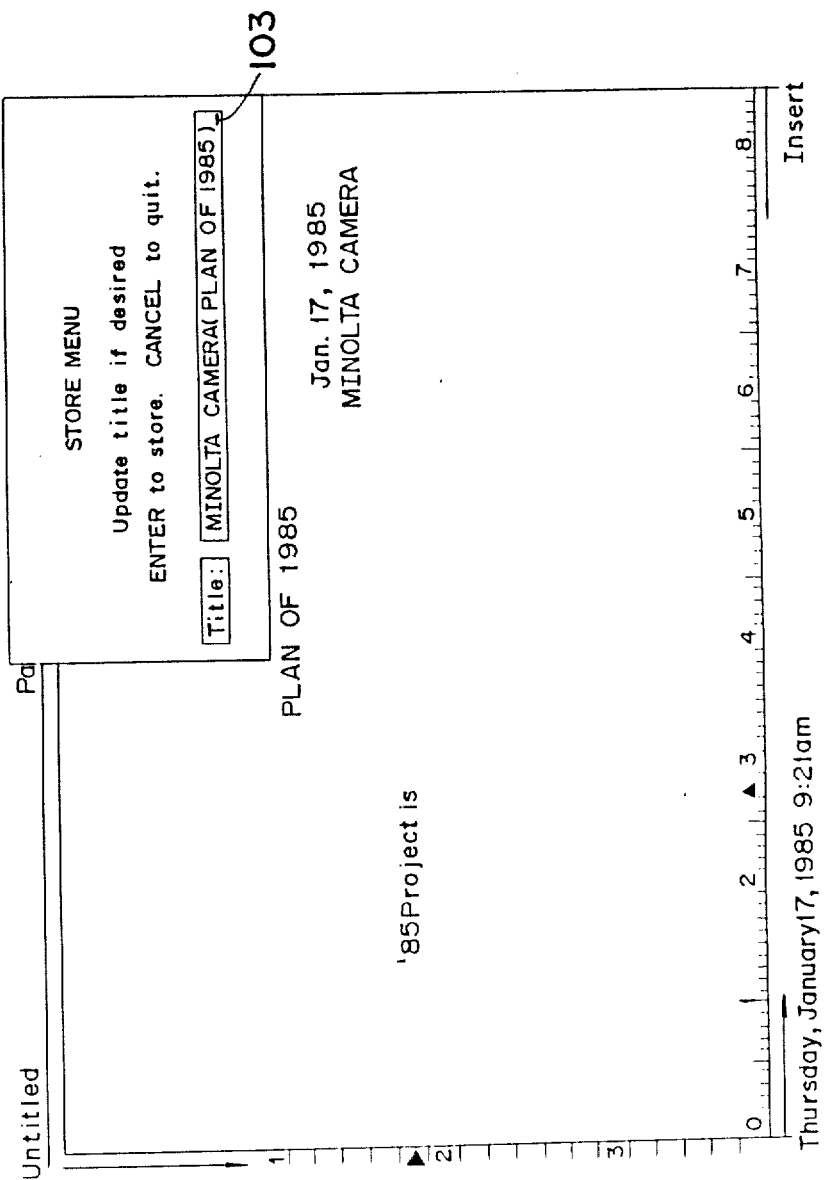

As a final example, input of a title of the new document shown in FIG. 12 will be described hereinbelow. After the document shown in FIG. 12 has been produced, the document storage key 526 is depressed ("YES" at step P26) and then, a title is inputted from the keyboard 500 at step P50 (FIG. 6). Thereafter, when the Enter key 545 is depressed at step P50 ("YES" at step P51), the inputted title is registered (step P2). In FIG. 14, for example, the title "MINOLTA CAMERA (PLAN OF 1985)" is inputted. Subsequently, when the Files key 542 is depressed, the title 132 registered is displayed on the CRT screen 102 as the Files screen of FIG. 15.

Although the present invention has been fully described by way of examples with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A word processor comprising:
   a screen display means for displaying characters or the like on a screen;
   a key input means for inputting the characters or the like of documents in the form of data including a title for a document and various commands;
   a print means for printing document data of documents;
   a document producing means for producing documents from data inputted from said key input means including a recording medium for receiving the document data and for outputting said document data to said print means;
   means for permitting an operator to input a title to said document, produced by said document producing means, by the key input means in response to a first command from said key input means, and
   a document management means for inputting, in accordance with a second command received from said key input means, document management data to a document management data area located at a determined position of said recording medium, and for outputting document management data stored in said recording medium to said screen display means, said document management data stored in said recording medium including titles of said documents stored in said recording medium and access data for filed corresponding to said documents; said document management means includes a title producing means for automatically producing, in response to the second command received when an untitled document is under processing, a title of said untitled document from a character string of a predetermined number of characters occupying a portion of said untitled document.

2. A word processor as claimed in claim 1, wherein said character string starts from a first character of said untitled document.

3. A word processor as claimed in claim 1 or 2, wherein said title producing means reduces to one print space in length data obtained by excluding characters for blank codes from said character string.

4. A word processor as claimed in claim 1, further comprising means for displaying a message as indicative of a document with no title on said screen display means if no document title exists when said document is to be stored in a recording medium.

5. A word processor as claimed in claim 4, wherein said displaying means displays said message also if said untitled document to be stored has alphanumeric characters unavailable.

6. A word processor comprising:
   a screen display means for displaying characters or the like on a screen;
   a key input means for inputting the characters or the like of documents in the form of data including a title for a document and various commands;
   a print means for printing document data of documents;
   a document producing means producing said documents from data inputted from said key input means including a recording medium and for outputting said document data to said print means;
   means for permitting an operator to input the title to said document produced by said document producing means by the key input means in response to a first command from said key input means;
   a document management means for inputting, in accordance with a second command received from said key input means, document management data to a document management data area located at a predetermined position of said recording medium, and for outputting document management data stored in said recording medium to said screen display means, said document management data stored in said recording medium including medium and access data for files corresponding to said documents;
   said key input means including a command means for giving a command for the start of production of a new document;
   said document management means includes a title producing means for automatically producing, in response to said command of start received from said command means when an untitled document is under processing, a title of said untitled document from a character string of a predetermined number of characters occupying a portion of said untitled document so as to store the title of said untitled document in said document management data area of said recording medium.

7. A word processor as claimed in claim 6, wherein said character string starts from a first character of said untitled document.

8. A word processor as claimed in claim 6 or 7, wherein said title producing means reduces to one print space in length data obtained by excluding characters for blank codes from said character string.

9. An improved word processor system for identifying stored documents to an operator, comprising:
   a display screen for disclosing stored documents;
   a keyboard for inputting text including means for indicating the start of input of a document text;
   means for storing each separate document text in the form of data for use on the display screen;
   means for determining if the inputted text has been identified with a predetermined title;
   means for displaying on the display screen an indication of no existing title for the document text when the means for determining no title indicates no title exists;
   means for permitting the operator to subjectively input a title to the document text, and
   means for automatically producing a title for an inputted document text without a title when the means for indicating the start of a document text has been enabled and the operator has not inputted a title to the preceding inputted document text.

10. A word processor system for identifying stored documents to an operator, comprising:
    a screen display means for displaying characters or the like on a screen;
    a key input means for inputting the characters of documents in the form of data including a title for a document and various commands;
    a document producing means producing said documents from data inputted from said key input means;
    means for permitting an operator to input the title to said document produced by said document producing means in response to a command from said key input means;

a determining means for determining if the document has been identified with a predetermined title, and a storing means for storing said each separate document in a recording medium with the title of the document to be stored in response to a storage command from the key input means, and said storing means including a title producing means for automatically producing the title for the document to be stored by the storing means when the determining means determines the document to be stored has not been identified with the title.

11. A word processor as claimed in claim 10, wherein said title producing means produces the title of said unidentified document from a character string of a predetermined number of characters occupying a portion of said unidentified document to be stored.

12. A word processor as claimed in claim 11, wherein said character string starts from a first character of said unidentified document to be stored.

13. A word processor as claim in claim 10, further comprising means for displaying on the screen display an indication of no existing title for the document when the determining means determines the document has not been identified with the title.

14. An improved word processor system for identifying stored documents to an operator, comprising:

a display screen for disclosing stored documents;

a keyboard for inputting text including means for indicating the start of input of a document text;

means for storing each separate document text in the form of data for use on the display screen;

means for determining if the inputted text has been identified with a predetermined title; determining no title indicates no title exists;

means for permitting an operator to subjectively input a title to the document text, and title producing means for automatically producing a title for an inputted document text without a title when the means for indicating the start of a document text has been enabled and the operator has not inputted a title to the preceding inputted document text.

15. A word processor as claimed in claim 14, wherein said title producing means produces the title of said document without the title from a character string of a predetermined number of characters occupying a portion of said preceding document.

16. A word processor as claimed in claim 15, wherein said character string starts from a first character of said preceding document.

* * * * *